United States Patent [19]

Rionda et al.

[11] Patent Number: 4,571,114

[45] Date of Patent: Feb. 18, 1986

[54] STRAP CONNECTOR

[75] Inventors: Carlos S. Rionda; Joaquin J. Palacio, both of Miami, Fla.

[73] Assignee: Gang-Nail Systems, Inc., Miami, Fla.

[21] Appl. No.: 460,386

[22] Filed: Jan. 24, 1983

[51] Int. Cl.⁴ .............................................. F16B 1/00
[52] U.S. Cl. .................................... 403/400; 403/346; 403/405.1; 403/382; 248/248; 411/466
[58] Field of Search ............ 403/400, 405, 283, 232.1, 403/206, 384, 382, 346; 248/248, 217.3; 411/466, 467, 461, 462

[56] References Cited

U.S. PATENT DOCUMENTS

| 2,264,666 | 12/1941 | Hexdall | 411/466 |
| 3,025,577 | 3/1962 | Jureit | 52/693 |
| 3,063,103 | 11/1962 | Rylander | 52/289 X |
| 3,298,151 | 1/1967 | Jureit | 52/644 |
| 4,078,352 | 3/1978 | Knowles | 52/696 X |
| 4,297,048 | 10/1981 | Jureit et al. | 403/217 X |

FOREIGN PATENT DOCUMENTS 1295047  11/1972  United Kingdom ................ 411/466

Primary Examiner—Andrew V. Kundrat
Attorney, Agent, or Firm—LeBlanc, Nolan, Shur & Nies

[57] ABSTRACT

A strap for attaching together wooden members having faces disposed in different planes. The strap includes a first connecting plate disposed in a first plane, the first connecting plate having a plurality of teeth projecting generally orthogonally from a surface of the first connecting plate which teeth are adapted to be embedded in the face of a wooden member; a second connecting plate disposed in a second plane which is not parallel to the first plane, the second connecting plate having a plurality of teeth projecting generally orthogonally from a surface of the second connecting plate which teeth are adapted to be embedded in the face of another wooden member; a connecting strip having first and second ends and an intermediate section, the first end being joined to the first plate and the second end being joined to the second plate; and the first and second plates each having a common centerline which passes through the connecting strip. The intermediate section of the strap is twisted so that the first and second plates are rotated with respect to each other.

1 Claim, 3 Drawing Figures

STRAP CONNECTOR

BACKGROUND OF THE INVENTION

1. Field of the Invention

The invention relates to connecting straps which are used for connecting together wooden members having faces disposed in different planes.

2. Description of the Prior Art

Connector plates are known for attaching parallel spaced apart beams for forming truss assemblies from dimension lumber such as 2"×4"s by the embedding of teeth projecting from such connecting plates into surfaces of the dimension lumber used for making the truss assemblies. U.S. Pat. Nos. 3,025,577 to Jureit, 3,298,151 to Jureit and 4,078,352 to Knowles and applicants' commonly assigned U. S. patent application Ser. No. 337,671 entitled Truss Structures Constructed with Metal Web Members filed on Jan. 7, 1982 each disclose hardware used for forming trusses from spaced apart pieces of dimension lumber.

In addition, attachment members having connecting plates disposed in a single plane for attaching wooden members together are known.

U.S. Pat. No. 4,297,048 to Jureit et al. discloses hardware for joining wooden members by the embedment of teeth projecting orthogonally from connecting plates into faces of the respective wooden members which are orthogonally disposed with respect to each other such that the faces of the connecting plates also intersect orthogonally.

There are many applications in the construction industry where it is necessary to join together two wooden members where it is not possible to use a bracket having connecting plates which intersect to form a 90° angle such as those described in the above-noted U.S. Pat. No. 4,297,048. One such application is the attachment of a truss member which sits on top of a wall plate to the wall plate. The truss members may be disposed horizontally with respect to the wall plate such as when they are used in supporting a floor joist or certain parts of a roof truss and may be disposed at an angle with respect to the wall plate when they are used in supporting other parts of a roof truss.

SUMMARY OF THE INVENTION

An object of the present invention is to provide a strap which extends along a straight line and is capable of interconnecting wooden members having faces disposed in different planes without the use of nails or other fasteners.

A further object of the present invention is to provide a strap having two connecting plates joining together floor or roof trusses to a wall plate without the use of nails or other fasteners by the embedding of teeth projecting orthogonally from the connecting plates in respective surfaces of the truss member and the wall plate such that the center lines of the connecting plates are parallel.

A strap in accordance with the present invention has connecting plates disposed in different planes but having parallel centerlines passing through the connecting plates of the strap when they are attached to the wooden members.

A strap for attaching wooden members in accordance with the invention includes: a first connecting plate disposed in a first plane, the first plate having a plurality of teeth projecting generally orthogonally from a surface of the connecting plate which teeth are adapted to be embedded in the face of a wooden member; a second connecting plate disposed in a second plane which is not parallel to the first plane, the second plate having a plurality of teeth projecting generally orthogonally from a surface of the second connecting plate which teeth are adapted to be embedded in the face of another wooden member; and a connecting strip having first and second ends and an intermediate section, the first end being joined to the first plate and the second end being joined to the second plate; and the first and second plates each having a common centerline which passes through the connecting strip. The intermediate section of the strip is twisted so that the first and second plates are rotated with respect to each other.

DESCRIPTION OF THE PREFERRED EMBODIMENT

Figure 1:
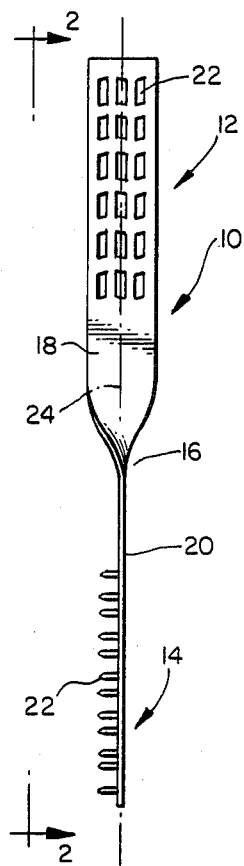
FIG. 1 is a front elevational view of a strap in accordance with the invention.
Figure 2:
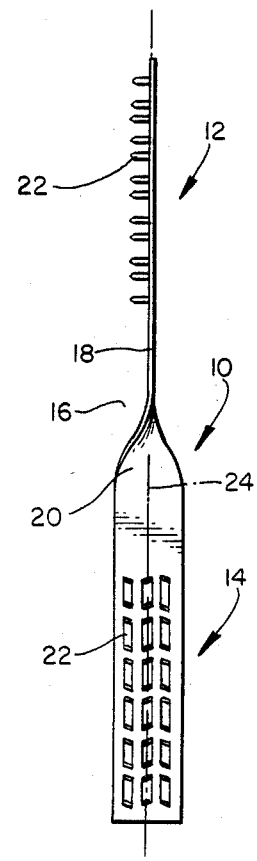
FIG. 2 is a front elevational view of the invention which has been rotated 90° clockwise with respect to the view of FIG. 1.

A strap 10 for interconnecting wooden members having faces disposed in different planes is illustrated in FIGS. 1 and 2. The strap 10 includes a first connecting plate 12 which is disposed in a first plane and a second connecting plate 14 which is disposed in a second plane which is rotated 90° with respect to the first plane. The connecting plates are joined together by a connecting strip 16 which contains a 90° twist between a first end 18 which is attached to the first connecting plate 12 and a second end 20 which is attached to the second connecting plate 14. A common centerline 24 runs through the center of the first connecting plate 12, the axis of twist of the connecting strip 16 and the center of the connecting plate 14.

Each connecting plate contains a plurality of teeth 22 which are struck from the plate and project generally orthogonally from a surface of the connecting plate. Preferably, the teeth are made in accordance with the commonly assigned U.S. Pat. No. 4,343,580.

Figure 3:
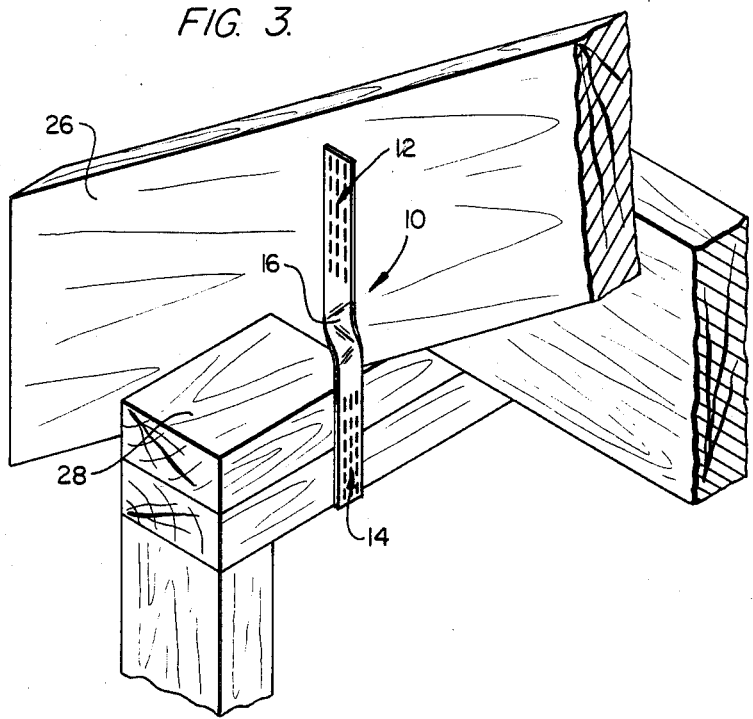
FIG. 3 illustrates the use of the invention to attach a truss member to a wall plate.

FIG. 3 illustrates the use of the strap 10 for connecting a roof truss 26 to a wall plate 28. The strap 10 is connected to the roof truss 26 and the wall plate 28 by embedding the teeth of the respective connecting plates within the wood of the roof truss and wall plate 28. It is within the scope of the present invention, to use the strap for the attachment of a roof truss 26 to a wall plate 28 or any other type of truss to a wooden member. The strap 10 is attached by driving teeth 22 of the connecting plates 12 and 14 into the respective surfaces of the roof truss and wall plate to which the strap 10 is attached.

The strap, according to the present invention, provides the advantage that the resultant attachment is extremely strong and does not require the use of fasteners such as nails to be driven into the wood of the roof truss 26 and wall plate 28 to secure the attachment which can be time consuming and produce connections which do not have the strength of the connection produced by the present invention.

While the present invention has been illustrated for use in attaching a roof truss to a wall plate, it should be clearly understood that it is not limited to the attachment of roof trusses to wall plates. For example, the invention may be used to attach floor trusses to wall plates or for attaching any two wooden members having orthogonally disposed surfaces in which the centerlines passing through the center of the points of attachment of the connecting plates to the surfaces of the wooden members are parallel and preferably commonly aligned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A structural joint including a pair of wooden structural members having faces disposed in different planes and a strap for joining said wooden members, said strap comprising:
   (a) a first connecting plate disposed in a first plane, said first connecting plate having a plurality of rows of teeth projecting generally orthogonally from a surface of said first connecting plate, said teeth being embedded in a face of one of said wooden members;
   (b) a second connecting plate disposed in a second plane that is not parallel to the first plane, said second connecting plate having a plurality of rows of teeth projecting generally orthogonally from a surface of said second connecting plate, said teeth being embedded in a face of another of said wooden members;
   (c) a connecting strip having first and second ends with an intermediate section which is twisted, said first end being joined to said first connecting plate and said second end being joined to said second connecting plate, said intermediate section being twisted approximately 90 degrees so that said first and second connecting plates are rotated approximately 90 degrees with respect to each other; and
   (d) said first and second connecting plates having a common centerline which passes through the center of the first connecting plate, the axis of twist of the connecting strip and the center of the second connecting plate, the plurality of rows of teeth of said first and second connecting plates being sufficient in number and size to occupy a major portion of said surface of each of said first and second connecting plates, said plurality of rows of teeth including, for each of said first and second connecting plates, a plurality of vertical rows of teeth which are equally spaced vertically and horizontally, said vertical rows including a center row which is bisected by said common centerline and with an equal number of vertical rows on either side of said center row, each row of teeth being formed of a plurality of pairs of teeth struck from the respective connecting plate with a longitudinal slot extending between the teeth of each pair of teeth.

* * * * *